United States Patent [19]
Macchi

[11] Patent Number: 6,085,873
[45] Date of Patent: Jul. 11, 2000

[54] PNEUMATIC ELEVATOR

[76] Inventor: Anselmo John Macchi, 1580 Broad St., Hartford, Conn. 06106

[21] Appl. No.: 09/320,935

[22] Filed: May 27, 1999

[51] Int. Cl.⁷ .................................................. B65G 51/00
[52] U.S. Cl. ........................ 187/273; 187/274; 187/275; 187/305; 187/373; 187/400
[58] Field of Search .................................. 187/273, 272, 187/274, 275, 250, 305, 351, 373, 414, 400; 454/3, 8, 15, 25, 68

[56] References Cited

U.S. PATENT DOCUMENTS

| | | | |
|---|---|---|---|
| 994,057 | 5/1911 | Claycomp | 454/13 |
| 3,318,418 | 5/1967 | Kilpatrick | 187/273 |
| 3,949,953 | 4/1976 | Hopkins | 187/273 |
| 4,023,500 | 5/1977 | Diggs | 227/331 |
| 4,487,410 | 12/1984 | Sassak | 472/131 |
| 4,488,621 | 12/1984 | Schiewe | 187/347 |
| 4,521,130 | 6/1985 | Lenhart | 406/86 |
| 4,948,303 | 8/1990 | Good | 406/186 |
| 4,997,060 | 3/1991 | Sassak | 182/48 |
| 5,235,144 | 8/1993 | Matsui et al. | 187/250 |
| 5,407,029 | 4/1995 | Salmon et al. | 187/340 |
| 5,445,060 | 8/1995 | Randall et al. | 92/118 |
| 5,447,211 | 9/1995 | Sors | 187/277 |
| 5,583,326 | 12/1996 | Sors | 187/273 |
| 5,593,347 | 1/1997 | Mandy et al. | 187/414 |
| 5,718,627 | 2/1998 | Wicks | 454/68 |

FOREIGN PATENT DOCUMENTS 1685850  10/1991  U.S.S.R. ................ 187/273

Primary Examiner—Dean J. Kramer
Assistant Examiner—Paul T. Chin
Attorney, Agent, or Firm—Pepe & Hazard LLP

[57] ABSTRACT

A pneumatically operated elevator has a pair of elongated vertical tubular cylindrical shafts and horizontally extending cross-over shafts extending between the vertical shafts adjacent their upper and lower ends to provide a substantially closed system. A cab is disposed within one of the vertical shafts, and a fan in at least one of the cross-over shafts moves air between the ends of the shafts to produce a pressure differential above and below the cab to cause the cab to move upwardly and downwardly in the one shaft. At least one vent is provided to admit air into at least one of the shafts to compensate for leakage from the shafts.

13 Claims, 5 Drawing Sheets

PNEUMATIC ELEVATOR

BACKGROUND OF THE INVENTION

The present invention relates to elevators, and, more particularly, to pneumatically operated elevators relying upon air pressure to move the elevator cab.

In high rise structures, access elevators are limited in height they serve by the weight of the steel cables. Theses cables become so heavy that elevator load capacity is greatly reduced, generally limiting the height served to about 30 floors. To accommodate this condition, elevator systems are segmented into steps of vertical lift, to transfer floors where other elevators at offset locations commence another lift, the number of segments is determined by the structure height. This system, today's state of the art, is cumbersome, uses too much space and is costly.

There have been various proposals for using air pressure to move an elevator cab upwardly and downwardly, and in one instance, to move a transport vehicle horizontally in a tube.

Existing patents on pneumatic elevators rely on shafts containing an elevator cab which is moved by drawing in or expelling large volumes of air from the shaft directly to the outside. This process requires large volumes of filtered treatment of air for variations in weather and seasonal changes and tends to be impractical, awkward and costly.

Illustrative of such efforts in the prior art are Kilpatrick U.S. Pat. No. 3,318,418, Hopkins U.S. Pat. No. 3,949,953, Diggs U.S. Pat. No. 4,023,500, Sassak U.S. Pat. Nos. 4,487,410 and 4,997,060, and Sors U.S. Pat. Nos. 5,447,211 and 5,583,326. Some of these devices rely upon a fan or other means, to provide a large volume of air at substantial velocity acting on the bottom of the cab to move it upwardly and to then reduce the volume of air in a controlled manner to allow the car to move downwardly.

Sors U.S. Pat. Nos. 5,447,211 and 5,583,326 rely upon creating a negative pressure above the car to cause it to rise by reason of the vacuum.

Sassak U.S. Pat. No. 4,997,060 discloses the use of air to provide a cushion for a car in a free fall in a high-rise structure.

Diggs U.S. Pat. No. 4,023,500 is of interest in that he creates a differential in pressure to move a passenger carrying vehicle along a tunnel.

As will be readily appreciated, moving large volumes of air at high velocity into a shaft containing a cab to provide a lifting motion is relatively expensive if the air is drawn from outside the building and since it should be filtered or otherwise treated so as not to contaminate the remainder of the building into which the air will normally escape.

It is an object of the present invention to provide a novel pneumatic elevator assembly in which the cab moves upwardly and downwardly in an essentially closed system of shafts using the same circulated air to move the cab in both directions and requiring only replacement of the small amount of air which is lost by leakage.

It is also an object to provide such an pneumatic elevator assembly which may be fabricated relatively economically and which is relatively simple to operate and maintain.

Another object is to provide such an elevator assembly which is fail-safe and can be used effectively in high-rise buildings.

Still another object is to provide such an elevator assembly which circulates the same air at substantially ambient atmospheric pressure.

SUMMARY OF THE INVENTION

It has now been found that the foregoing and related objects may be readily attained in a pneumatically operated elevator assembly comprising a pair of elongated vertical tubular cylindrical shafts of substantially equal volume with closed ends and horizontally extending cross-over shafts extending between the vertical shafts adjacent their upper and lower ends, providing a closed system. An elevator cab is disposed within one of the vertical shafts and is cooperatively dimensioned with respect to the one shaft so as to seat snugly therewithin.

Sealing means is provided on the periphery of the cab in sealing engagement with the inner surface of the shaft, and fan means is provided in at least one of the cross-over shafts for moving air between the opposite ends of the one shaft to produce a pressure differential above and below the cab to cause the cab to move upwardly and downwardly in the one shaft.

A multiplicity of vertically spaced doors is provided along the length of the shaft, and a door on the cab is alignable with the doors in the shaft. Control means in the cab and at each elevator stop are operatively connected to the fan means and doors to effect operation thereof. At least one vent is provided to admit air into at least one of the vertical and cross-over shafts to maintain substantially ambient pressure conditions in the closed system and to compensate for leakage from the shafts during cab movement and door opening.

Preferably, the upper ends of the shafts have dome-shaped caps. The one shaft has a multiplicity of elongated rails extending vertically and spaced about its inner periphery, and the periphery of the cab has cooperating recesses therein in which the rails are received.

Sealing means is provided about the doors in the one shaft and desirably cooperate with sealing means on the cab about the door therein, and the cab has brake means thereon engageable with the rails to hold the cab in position. Pressure sensing means are provided to sense pressure in the shaft above and below the cab.

Preferably, fan means are provided in both cross-over shafts, and desirably the fan means comprise reversible, variably speed fans with variably pitch blades. The cross-over shaft adjacent the lower end of the one shaft is spaced upwardly from its lower end to provide a confined area therebelow in which the compression of air in the event of a free fall of the cab provides a cushion for the cab. Valve means is provided to control the flow of air outwardly from the confined area.

Desirably, another cross-over shaft is provided from the confined area and the valve means is disposed therein.

The shafts are assembled from sections and reinforcing collars are provided about the junctures between adjacent sections.

DETAILED DESCRIPTION OF THE PREFERRED EMBODIMENT

Figures 1, 2:
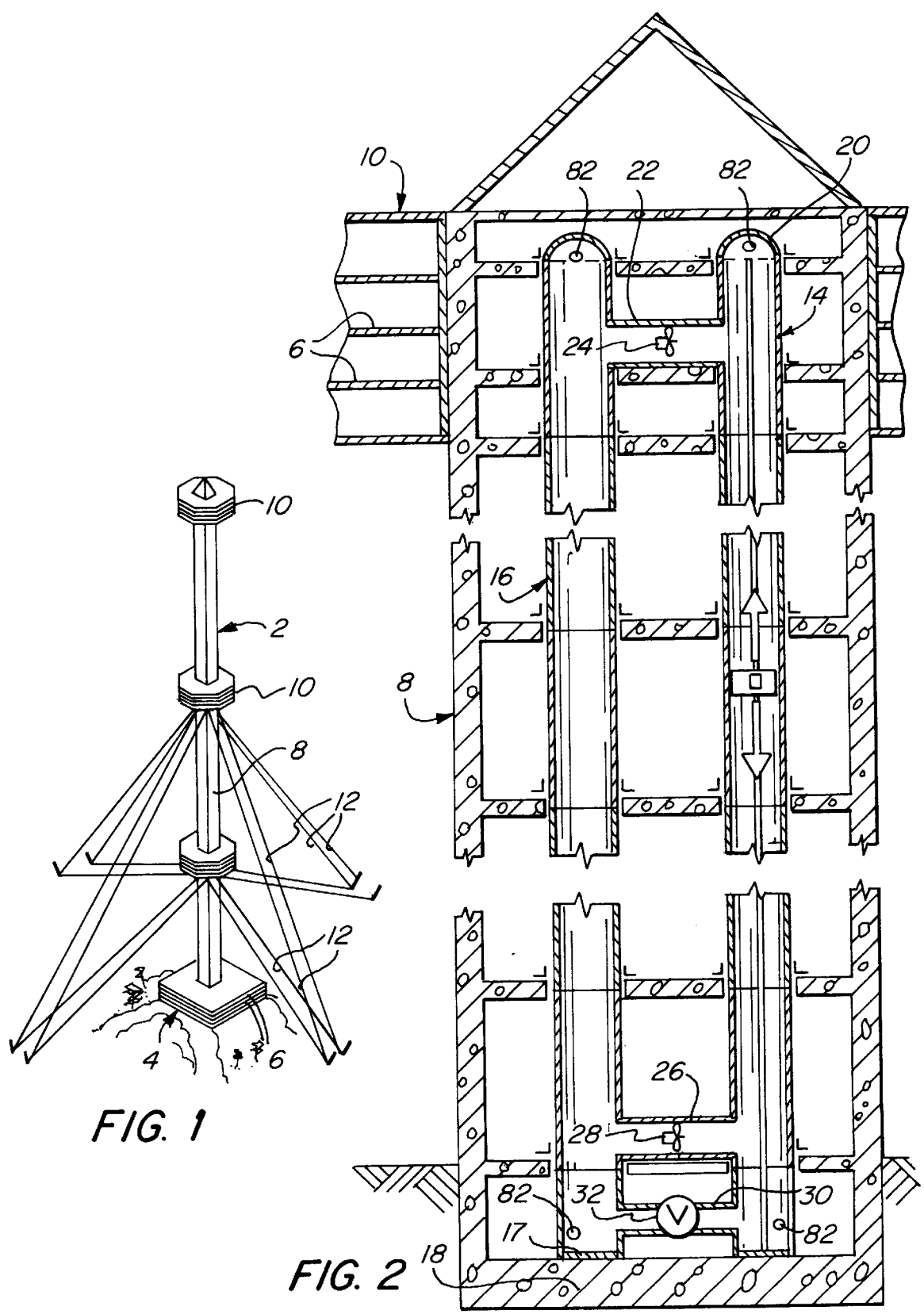
FIG. 1 is a partially diagrammatic illustration of a high rise building utilizing a pneumatic elevator assembly of the present invention.
FIG. 2 is a fragmentary sectional view of the core and a portion of a floor cluster of the building of FIG. 1 showing the elevator assembly therein.

Turning first to FIG. 1, therein illustrated is a high rise structure generally designated by the numeral 2 and containing an elevator embodying the present invention. As can be seen, there is a ground level base structure 4 comprised of a multiplicity of floors 6, a vertically extending core 8, and a series of office floor clusters 10 spaced vertically along the core 8. Cables 12 extend downwardly and outwardly from spaced locations along the core 8 so as to stabilize and support the structure 2 because of its extreme height.

Turning next to FIG. 2, the core 8 is fragmentarily illustrated in section and can be seen to contain two elongated vertical shafts generally designated by the numerals 14, 16 of general cylindrical nature extending from the base 4 to adjacent the upper end of the core 8. As can be seen, the shafts 14, 16 have a planar bottom wall 17 firmly seated on the base 18 and the upper ends are closed by dome shaped caps 20. Extending between the shafts 14, 16 adjacent the upper end is a cross-over shaft 22 containing a fan 24 and adjacent their lower ends is a lower cross-over shaft 26 containing a fan 28. Also extending between the shafts 14, 16 adjacent their lower ends below the cross-over shaft 26 is a vent tube 30 in which is provided a valve 32 for a purpose to be described hereinafter. As also seen in FIG. 2, a cab generally designated by the numeral 34 moves upwardly and downwardly within the shaft 14. As seen, the core 8 has transversely extending floor 6 with apertures therein through which the shafts 14, 16 extend.

Figure 3:
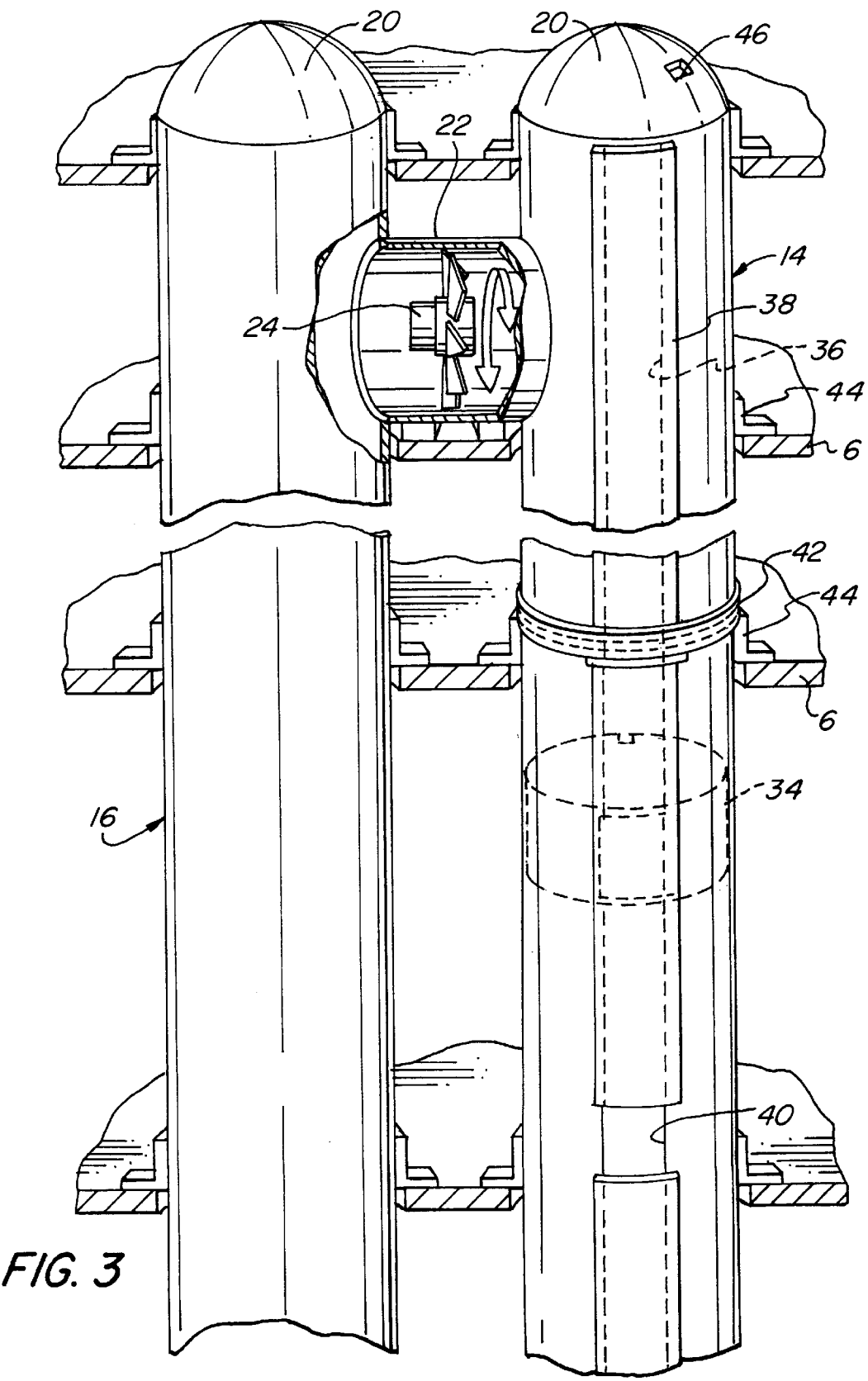
FIG. 3 is a fragmentary elevational view of the parallel shafts of the elevator assembly showing the cab in phantom line and with a portion of a cross-over shaft broken away to reveal a fan.

Turning now to FIG. 3, the main shaft 14 has an elongated opening 36 extending substantially over the length thereof and over which extends a closure panel 38 which has door openings 40 at each of the floors 6. The shafts 14, 16 are assembled from sections, and sleeved and sealed collars 42 are provided about the junctures to effect firm engagement. Support brackets 44 secure the shafts 14, 16 in fixed position at each of the floors 6, and a one way vent 46 is provided in the cap 20 at the top of the main shaft 14.

Figure 4:
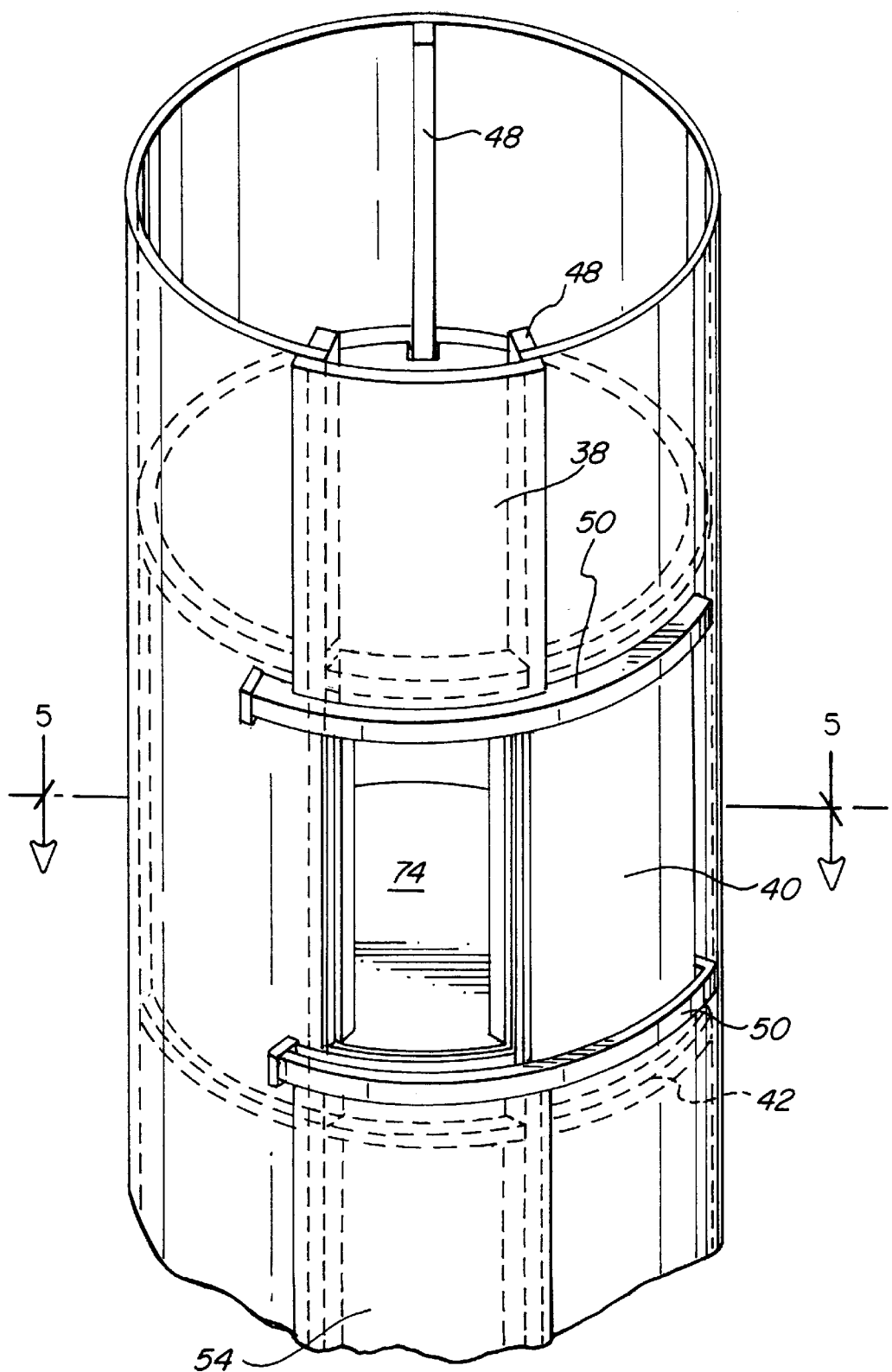
FIG. 4 is a fragmentary perspective view of the main shaft with the floor and cab doors open.
Figure 5:
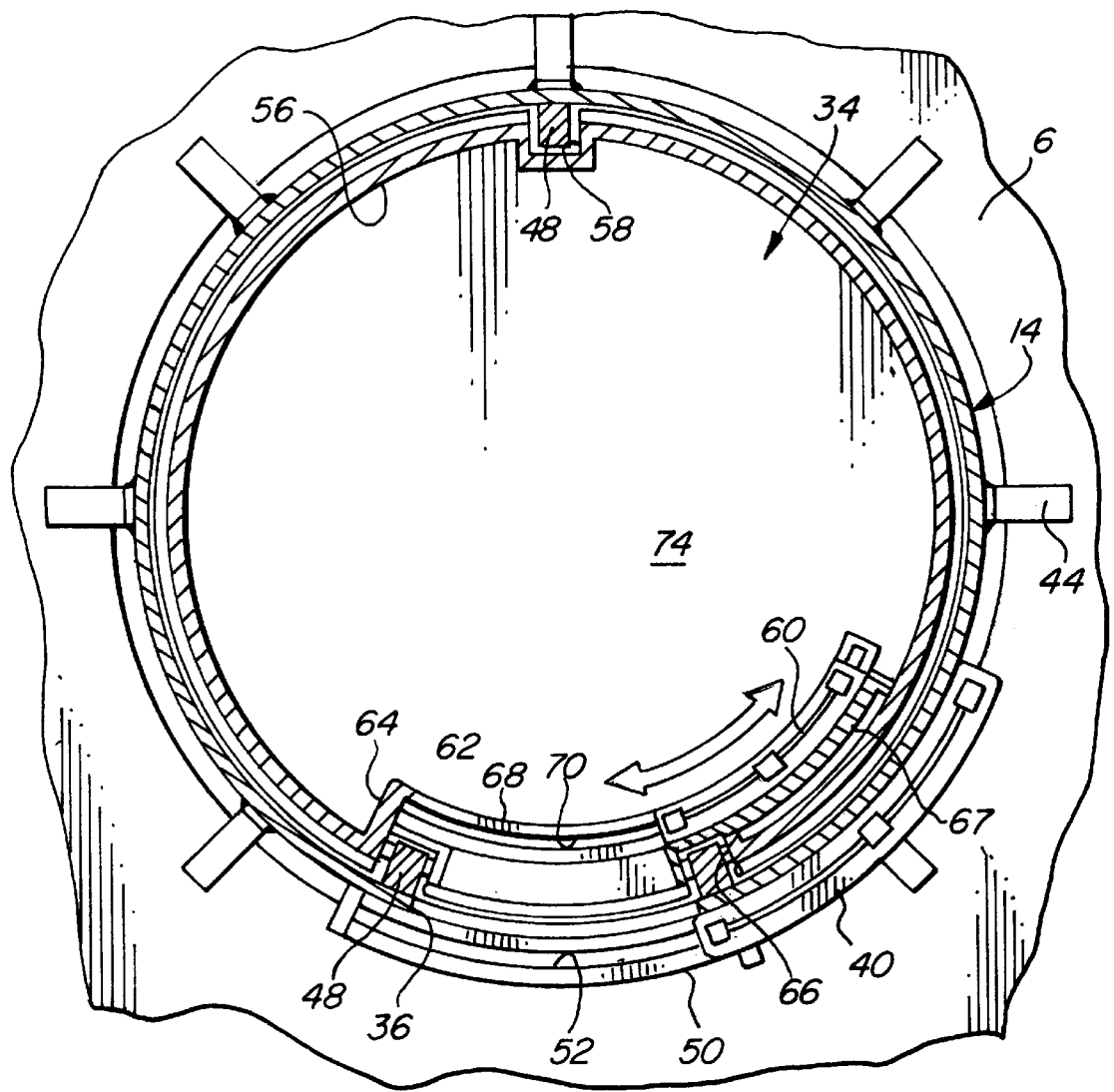
FIG. 5 is a fragmentary cross sectional view of the main shaft and cab along the line 5—5 of FIG. 4.

As seen in FIGS. 4 and 5, inwardly disposed vertically extending rails 48 are provided on either side of the opening 36 and on the opposite side of the main shaft 14, and are formed in sections which are sleeved. At the floors 6 located in the base structure 4 and floor clusters 10, horizontally extending rails 50 are secured through the shaft 14 to the vertical rails 48 and to the closure panel 38 above and below the shaft door openings 40 in the closure panel 38 to reinforce the shaft 14 and to provide tracks 52 in which the doors 54 slide from a position closing the shaft opening 40 seen at the upper floor in FIG. 3, to the position shown at the floor therebelow to permit entry into and exit from the cab 34.

The cab 34 has a generally cylindrical peripheral wall 56 which is dimensioned cooperatively with the peripheral wall of the shaft 14 so as to be closely spaced thereto, and it has a recesses 58 into which the vertical rails 48 extend. At the door opening in the cab 34, the rail receiving recess 58 at the closure side of the cab door 60 is provided by the channel member 62 which is secured to the internal flange 64, and the channel member 66 is secured to an inset portion 67 of the peripheral wall 56 frame the other side of the door opening as well as provide the recess 58 for the rail 48.

Above and below the door opening of the cab 34 are horizontal rails 68 which reinforce the peripheral wall of the cab 34 and provide tracks 70 in which the cab door 60 slides between open and closed positions as signified by the double headed arrow in FIG. 5.

Figure 6:
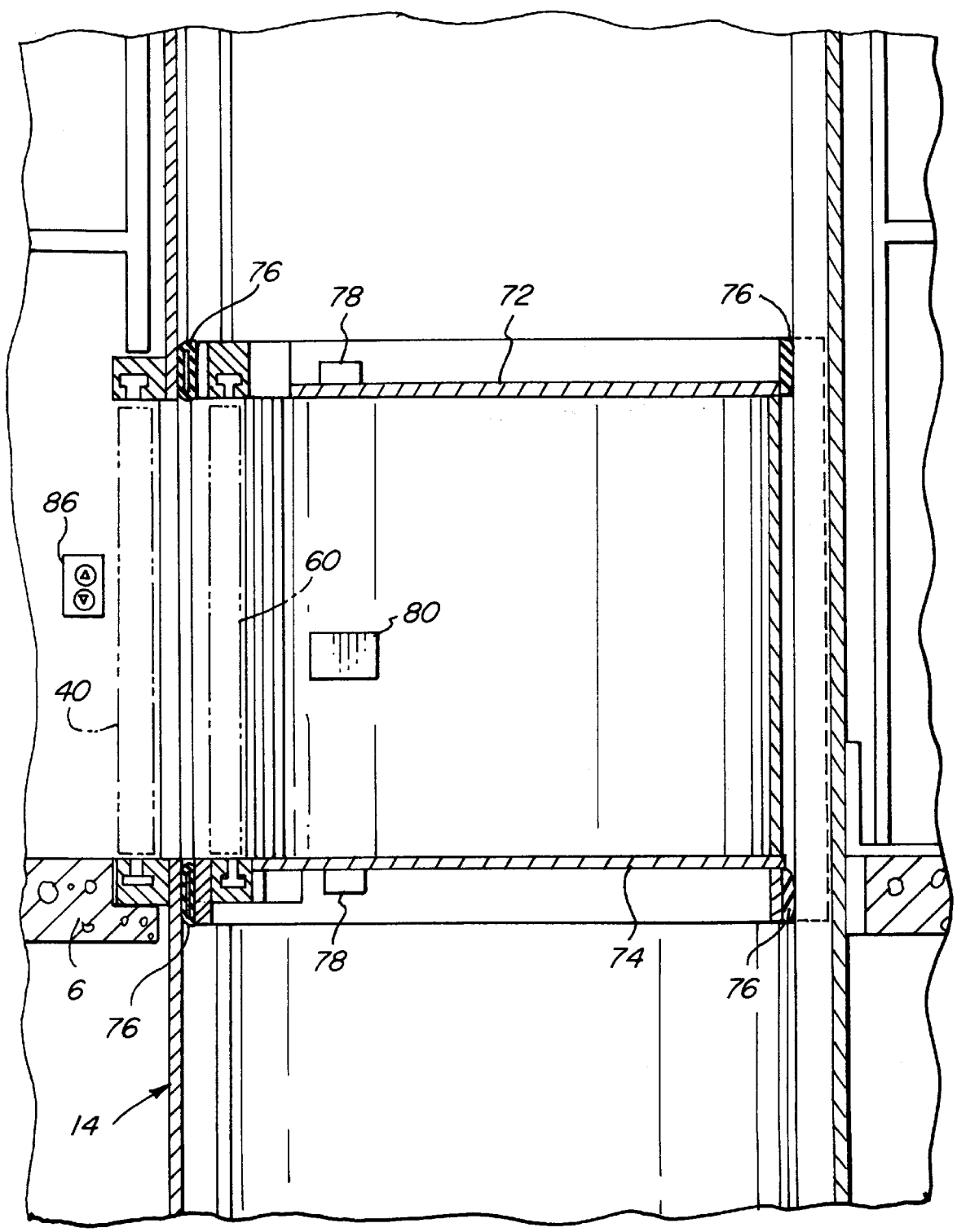
FIG. 6 is a fragmentary sectional view in elevation of the cab and main shaft.

Turning next to FIG. 6, it can be seen that the cab 34 has transversely extending roof 72 and floor 74, and circumferentially extending sealing elements 76 extend about the upper and lower periphery to provide a seal between the cab 34 and the peripheral wall of the main shaft 14. Sealing elements (not shown) may also be provided about the opening for the cab door 60 to cooperate with the sealing elements 76 on the shaft. On the roof 22 and floor 74 are pressure sensors 78, and a control unit 80 is provided in the cab 34. Up and down call button panels 86 are provided in the wall of the core 8 at each elevator stop.

Returning to FIG. 2, pressure sensors 82 are also provided in the shafts 14, 16 adjacent their upper and lower ends, and a computer control unit 84 is provided in the base structure 4.

In operation of the pneumatic elevator assembly of the present invention, movement of the elevator cab 34 upwardly and downwardly within the main shaft 14 occurs as a result of a differential in pressure in the main shaft 14 above and below the cab 34. To move the cab upwardly, greater pressure is exerted on the floor 74 of the cab 34 by operating the fans 24, 28 so as to introduce air under pressure through the cross-over shaft 26 into the bottom of the main shaft 14 while removing air through the upper cross-over shaft 22 by use of the fan 24.

Assuming a cab with a diameter of twelve feet and a desired rate of movement of about 20 feet per second or 13 miles per hour, this would require a differential of less than about one pound per square inch or 144 pounds per square foot. To do so, the fans should be able to produce a movement of the air into the main shaft below the cab at a rate of about 2200 cubic feet per second.

Similarly, movement of the cab downwardly within the main shaft 14 is effected by gravity (the weight of the cab 34) which displaces air from the lower portion of the main shaft 14 as the air is moved into the upper portion of the main shaft 14. Although fan motion is relied upon to control the rate of descent, the fan motion coupled with the cushioning effect of the enclosed air within the shaft below the cab 34 may be augmented by some braking action on the rails 48 in the event that the rate of downward movement becomes too high.

In this connection, the cab should be equipped with fail safe braking mechanisms to grip the rails in the event of a loss of power or some other catastrophic problem in the elevator assembly. The brakes can be magnetically, hydraulically or pneumatically held in a non-engaged position and automatically move into a braking condition in the event of such a failure.

Guide rollers or shoes can also be provided in the recesses on the cab to smooth the motion of the cab upwardly and downwardly with minimal friction.

The sealing members on the cab should be of relatively durable nature and can comprise solid elements of low friction materials such as polyamide resins or they may comprise resiliently compressible or deformable elements formed of materials such as resilient polyurethane. The sealing members about the shaft doors at each floor should have the same characteristics and, in this instance, there may be cooperating sealing elements on the main shaft.

Although it is essential only that there be doors only on floors where there is occupancy, it is desirable to have a number of doors in the core between the floor clusters to provide emergency access to the main shaft in the event of some breakdown.

The electronically controlled fans 24, 26 are reversible and variable speed and have variable pitch blades so as to provide a high degree of control of the fan action and thereby acceleration, deceleration and speed at comfortable levels.

Although only one fan could be employed, preferably in the lower cross-over, because of the control, use of two is preferred to provide greater control and a back-up system in the event of a failure of a fan unit.

In the event of catastrophic failure, in addition to the brakes heretofore described, the illustrated elevator assembly includes the valve 32 in the vent tube 30 from the closed air pocket below the lower cross-over shaft 26 at the bottom of the shafts 14. This valve essentially controls the rate of outflow of air from the closed pocket at the bottom of the main shaft 14 in the event of a free-falling elevator cab 34 so as to provide a cushion of air at the base of the main shaft 14 which is bled off at a controlled rate.

As will be readily appreciated, the sensors which are provided at the top and the bottom of the shafts 14, 16 and at the top and the bottom of the cab 34 provide information to the computer control which in turn controls operation of the fans and of the valve to provide the necessary differential or the safety cushion as the case may be. The elevator assembly is provided with conventional controls such as a control panel within the cab to select floors, and control panels on the core wall to allow the calling of a cab and also to identify its location.

The information from the control panel of the cab and the information from the pressure sensors on the cable can be transferred to the computer control in the core conveniently by a cable or contact surface located along the length of a rail. Similarly, power for lighting, communication and controls to the cab can be provided by the same or a separate cable along the length of the rail.

It will be appreciated that the volume of air in the secondary shaft 16 is substantially the same as that in the primary shaft so that the air is being moved between the shafts in a substantially sealed system. It is essentially impossible to avoid loss of some air from the system, and makeup air can be introduced through the one-way valve 46 at the top of the main shaft 14.

Thus, it can be seen that the pneumatic elevator assembly of the present invention is one which is relatively easy to fabricate and simple to operate. It eliminates the long cables which present a major problem in elevator operating over a substantial vertical distance. Energy costs are relatively small and operation is quite simple.

Having thus described the invention, what is claimed is:

1. A pneumatically operated elevator assembly comprising:
    (a) a pair of elongated vertical tubular cylindrical shafts of substantially equal volume and with closed ends;
    (b) horizontally extending cross-over shafts extending between said vertical shafts adjacent their upper and lower ends providing a closed system of shafts;
    (c) a cab disposed within one of said vertical shafts and cooperatively dimensioned with respect to said one shaft to seat snugly therewithin;
    (d) sealing means on the periphery of said cab in sealing engagement with the inner surface of said one shaft;
    (e) fan means in at least one of said cross-over shafts for moving air between the opposite ends of said one shaft to produce a pressure differential above and below said cab to cause said cab to move upwardly and downwardly in said one shaft;
    (f) a multiplicity of vertically spaced doors in said one shaft;
    (g) a door on said cab alignable with said doors in said one shaft;
    (h) control means in said cab operatively connected to said fan means and doors to effect operation thereof; and
    (i) at least one vent to admit air into at least one of said vertical and cross-over shafts to compensate for leakage from said shafts to maintain substantially ambient pressure conditions in said closed system of shafts.

2. The pneumatically operated elevator assembly in accordance with claim 1 wherein the upper ends of said shafts have dome-shaped caps.

3. The pneumatically operated elevator assembly in accordance with claim 1 wherein said one shaft has a multiplicity of elongated rails extending vertically and spaced about its inner periphery and said cab has cooperating recesses in its periphery in which said rails are received.

4. The pneumatically operated elevator assembly in accordance with claim 1 wherein sealing means is provided about said doors on said one shaft.

5. The pneumatically operated elevator assembly in accordance with claim 4 wherein said cab has sealing means about said door therein cooperating with said sealing means on said one shaft about said doors therein.

6. The pneumatically operated elevator assembly in accordance with claim 1 wherein said cab has brake means thereon engageable with said rails to hold said cab in position.

7. The pneumatically operated elevator assembly in accordance with claim 1 including pressure sensing means to sense pressure in said one shaft above and below said cab.

8. The pneumatically operated elevator assembly in accordance with claim 1 wherein fan means is provided in both cross-over shafts.

9. The pneumatically operated elevator assembly in accordance with claim 1 wherein said fan means is a reversible variable speed fan with variable pitch blades.

10. The pneumatically operated elevator assembly in accordance with claim 1 wherein said cross-over shaft adjacent said lower end of said vertical shafts is spaced upwardly from said lower end of one shaft to provide a confined area therebelow in which the compression of air in the event of a free fall of said cab provides a cushion for said cab.

11. The pneumatically operated elevator assembly in accordance with claim 10 wherein a valve means is provided to control the flow of air outwardly of said confined area.

12. The pneumatically operated elevator assembly in accordance with claim 11 wherein there is included a cross-over shaft between said confined area of said one shaft and the other of said shafts and said valve means is disposed therein.

13. The pneumatically operated elevator assembly in accordance with claim 1 wherein said shafts are fabricated from sections which are assembled and reinforcing collars are provided about the junctures between adjacent sections.

\* \* \* \* \*